United States Patent [19]

Bryant et al.

[11] 4,320,544
[45] Mar. 23, 1982

[54] COMBINATION DRILL AND SCREWDRIVER

[76] Inventors: Floyd C. Bryant, 900 Henley Pl., Charlotte, N.C. 28207; James R. Smith, Rte. 3, Box 92, Waxhaw, N.C. 28173

[21] Appl. No.: 85,675

[22] Filed: Oct. 17, 1979

[51] Int. Cl.³ ............................................. B26B 11/00
[52] U.S. Cl. .......................................... 7/158; 81/461; 411/395; 408/198; 408/713
[58] Field of Search ..................... 7/158, 165; 81/439, 81/442, 460, 461; 279/93, 94, 105; 408/198, 202, 226-228, 713; 411/395

[56] References Cited

U.S. PATENT DOCUMENTS

| | | | |
|---|---|---|---|
| 126,366 | 4/1872 | Wills | 411/395 |
| 1,501,222 | 7/1924 | Lamp | 81/439 |
| 3,216,288 | 11/1965 | Gardner | 408/202 |
| 3,336,611 | 8/1967 | Schepp | 7/158 |
| 4,092,753 | 6/1978 | Fuhrmann | 7/158 |
| 4,107,800 | 8/1978 | Jorgensen | 7/158 |

*Primary Examiner*—James G. Smith
*Attorney, Agent, or Firm*—L. Lawton Rogers, III

[57] ABSTRACT

A hand held tool for installing a threaded fastener in which the tool is adapted for use solely as a drill bit, solely as a screwdriver, and as a combination thereof, wherein the threaded fastener has a central bore extending therethrough. Extension of the drill bit beyond the end of the screwdriver blade may be selectively controlled, and the drill bit may be maintained in its entirety within the shaft of the screwdriver when not in use to thereby preserve the sharpness of the drill bit. A unique locking collar is also provided.

1 Claim, 9 Drawing Figures

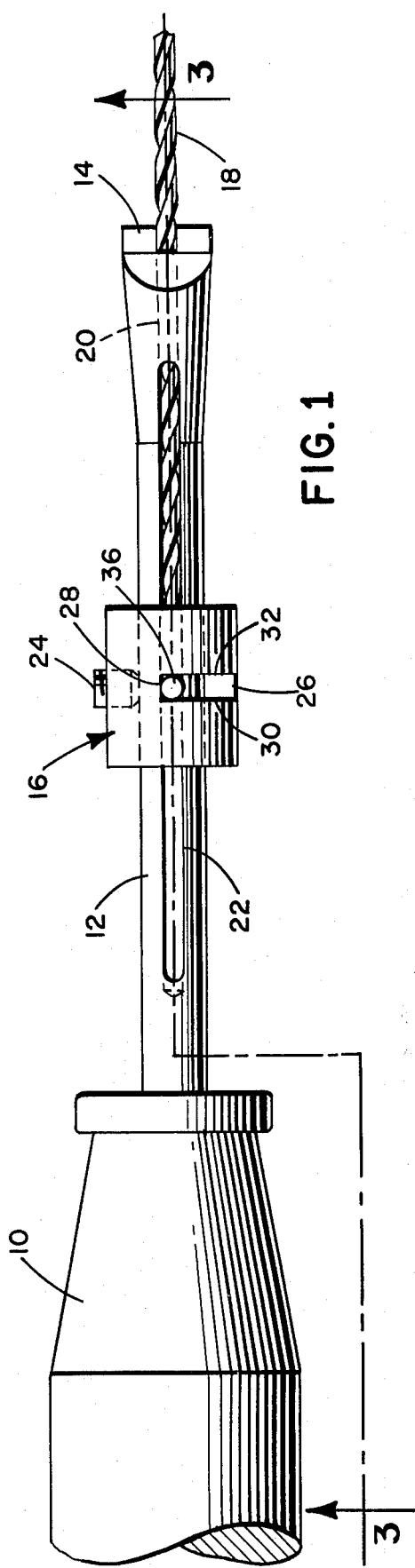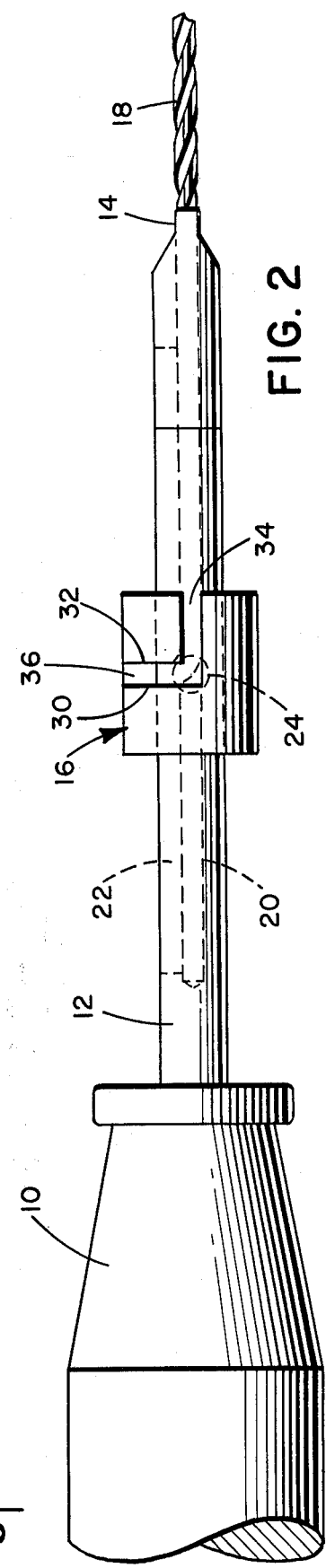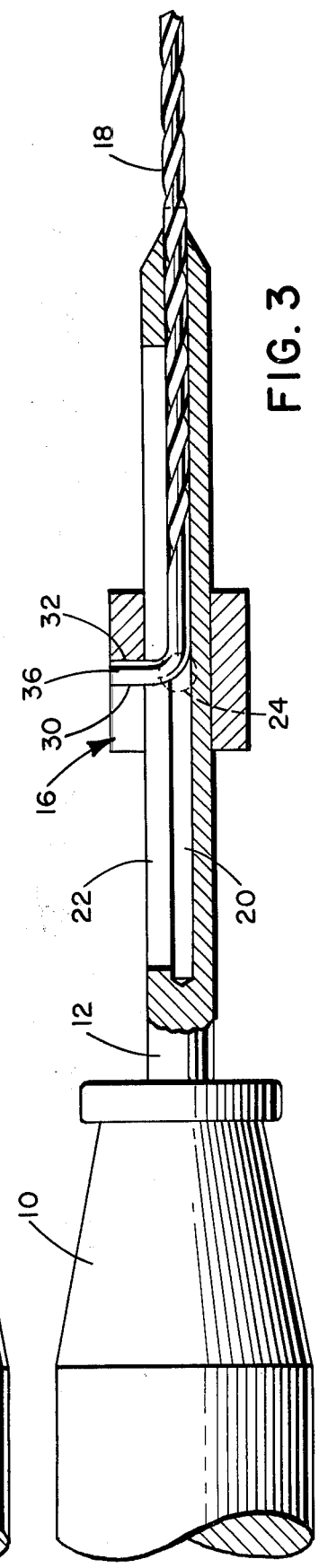

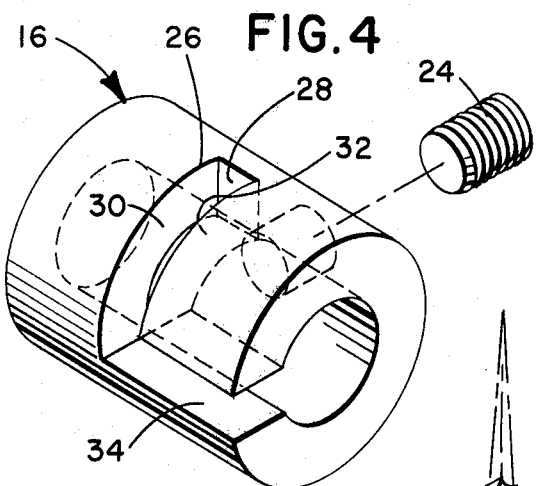
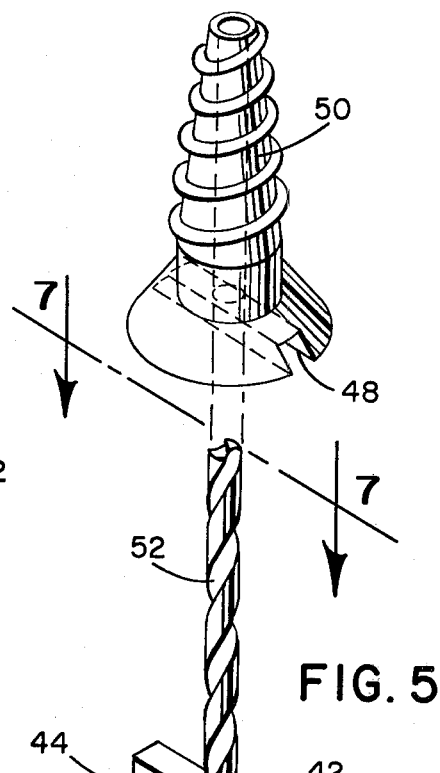
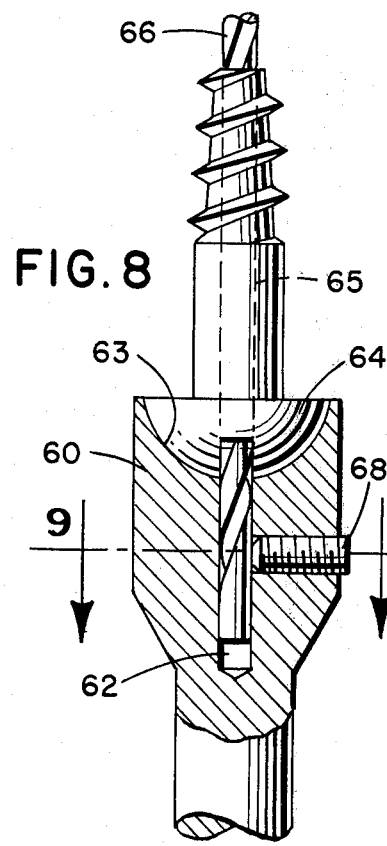
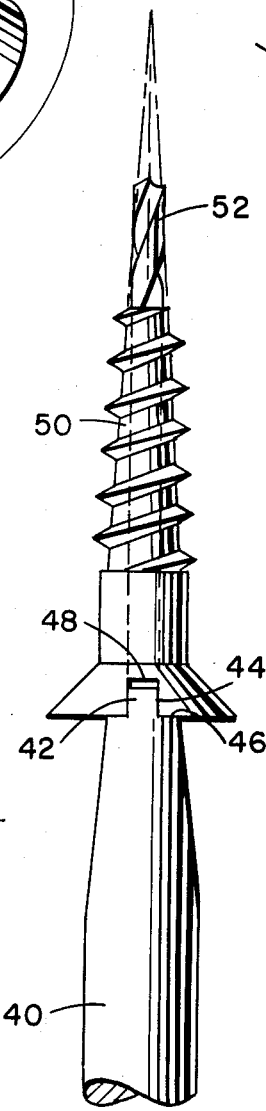
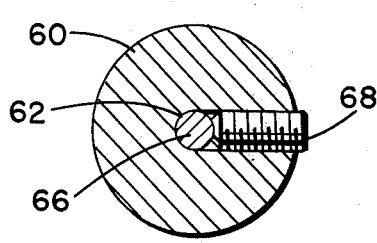
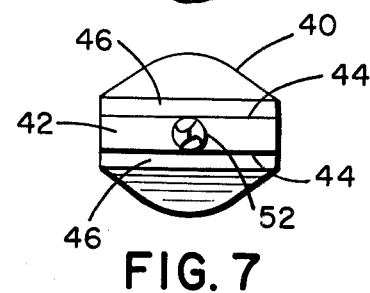

COMBINATION DRILL AND SCREWDRIVER

BACKGROUND OF THE INVENTION

This invention relates to methods and apparatus for installing a threaded fastener into a surface, and more particularly to installing a threaded fastener into an aperture in a surface in which the aperture is created as the threaded fastener is inserted.

Prior art techniques for inserting threaded fasteners have generally required two separate operations. Conventionally, an aperture is drilled, the drill removed, and the threaded fastener inserted into the aperture by means of a screwdriver.

While wood screws having central apertures are well known, as illustrated by the Wills U.S. Pat. No. 126,366, dated Apr. 30, 1872, such screws have not been widely used. Prior art attempts to utilize such screws with machine drilling tools, such as illustrated in the Sandor U.S. Pat. No. 3,289,290, dated Dec. 6, 1966, are generally quite complex and involve complicated clutching mechanisms, and the like.

In contrast, the present invention is extremely simple in its construction and operation as a hand tool and is economical in its manufacture.

It is thus an object of the present invention to provide a novel method and apparatus for installing a threaded fastener.

Another object of the present invention is to provide a novel combination drill and screwdriver.

It is a further object of the present invention to provide a novel drill and screwdriver in which the drill bit may be sheathed within the shaft of the screwdriver when not in use.

These and many other objects and advantages will be readily apparent from the claims and from the following detailed description when read in conjunction with the appended drawings.

DESCRIPTION OF THE DRAWINGS

FIG. 1 is a top plan view of one embodiment of the combination screw driver and drill bit of the present invention;

FIG. 2 is a side elevation of the embodiment of FIG. 1;

FIG. 3 is a sectional view taken along line 3—3 of FIG. 1;

FIG. 4 is a perspective view of the collar shown in FIGS. 1-3;

FIG. 5 is a pictorial view of the blade end of a second embodiment of the present invention;

FIG. 6 is an enlarged assembly view of the embodiment of FIG. 5;

FIG. 7 is a view taken along line 7—7 of FIG. 5;

FIG. 8 is an axial sectional view of a third embodiment of the present invention; and FIG. 9 is a section taken along line 9—9 of FIG. 8.

DETAILED DESCRIPTION OF THE PREFERRED EMBODIMENTS

With reference to the embodiment illustrated in FIGS. 1-4, the tool of the present invention includes a handle 10 adapted to be grasped by the human hand for manual rotation of the tool, an elongated rod-like member 12 configured in the embodiment illustrated for engagement with the groove of a screw or other threaded fastener (not shown), and a collar 16 adapted as will be shown to position a drill bit 18 with respect to the free end or blade 14 of the rod 12.

The rod 12 includes a central aperture 20 extending into the rod 12 from the free end thereof. An elongated slot 22 communicates with the bore 20 over a substantial portion of the length of the rod 12 intermediate the ends thereof. The width of the slot 22 conforms to the diameter of the bore 20 within the rod 12 which in turn conforms substantially to the diameter of the drill bit 18 intended for insertion therein.

The collar 16 is slidable along the length of the rod 12 and includes a set screw or other suitable conventional friction device 24 for maintaining the collar 16 in a selected axial position relative to the rod 12.

The collar 16 is also rotatable about the rod 12, and the set screw 24 serves to hold the collar 16 in a selected position relative to the rod 12.

As shown in FIGS. 1 and 4, the collar 16 is provided with a lateral slot 26 forming an axial wall 28, a forward facing lateral wall 30, and a rearward facing lateral wall 32. In addition, the collar 16 is provided with an axial slot 34 as shown in FIGS. 2 and 4. The axial slot 34 communicates with the lateral slot 26 adjacent one end thereof to provide, in combination, an L-shaped slot extending into the bore 20 of the rod 12. The drill bit 18 is conveniently bent at the butt end thereof at a 90° angle to the longitudinal axis of the bit to form a projection 36.

To assemble the tool, the collar 16 is slid rearwardly along the rod 12 towards the handle 10 to expose a sufficient length of the slot 22 so that the drill bit 18 may be inserted through the slot 22 into the bore 20 and slid forward to the desired degree of extension from the blade end 14 of the rod. The collar 16 is then rotated to align the axial slot 34 with the projection 36 of the drill bit 18, and the collar is slid forward until the projection 36 is laterally disposed in the lateral slot 26 of the collar. The collar 16 is then rotated to locate the projection 36 within the lateral slot between the forward facing surface 30 and the rearward facing surface 32. The set screw 24 may then be tightened to maintain the position of the collar relative to the rod 12.

In operation solely as a drill, the drill bit 18 may be extended to the desired depth of the hole, and the handle 10 manually rotated to drill the hole.

In operation solely as a screwdriver, the drill bit may be removed or located sufficiently rearward in the slot so that the drill bit does not extend longitudinally from the blade end 14 of the rod 12.

In use as a combination drill bit and screwdriver, a screw (or other threaded fastener of the type described in more detail in connection with FIGS. 5 and 6) with an axial bore extending the length thereof may be inserted over the end of the drill bit 18 to mate with the blade 14 of the screwdriver. In this position, the drill bit extends slightly beyond the end of the threaded fastener and rotation of the handle 10 will drill a hole.

As the drill bit enters the surface, small chips travel up the flutes of the drill bit and effect a locking action between the screw and the drill bit. This locking action helps prevent the blade 14 of the screwdriver from slipping out of the mating slots or other recesses provided in the head of the threaded fastener. Continued rotation of the handle 10 of the tool will thread the threaded fastener into the surface.

After the threaded fastener is inserted to the desired depth, the handle 10 may be pulled away from the surface. Because of the locking action between the drill bit and the screw as a result of chips, the drill bit will remain stationary while the tool is being pulled backward. When, however, the rearward facing surface 32 of the lateral slot 26 strikes the projection 36 of the drill bit, the blade will have moved sufficient distance to remove the blade 14 of the screwdriver from the head of the threaded fastener. Twisting of the tool in the same direction used in inserting the threaded fastener will break the locking action between the drill bit and the threaded fastener while not rotating the threaded fastener. Once this locking action has been broken, the drill bit may be removed from the threaded fastener, leaving the threaded fastener in place in the surface.

With reference now to the embodiment illustrated in FIGS. 5-7 inclusive, the free end 40 of the elongated rod may be shaped to form a blade portion 42 having rotation imparting side surfaces 44 and threaded fastener engaging surfaces 46. As illustrated in FIG. 6, the blade 42 is designed to mate with the groove 48 in the threaded fastener 50 to impart rotation to the threaded fastener upon the rotation of the tool.

With continued reference to FIGS. 5-7 inclusive, the blade 44 is provided with a drill bit 52 axially extending from the tool.

As illustrated in FIG. 6, it is desirable that the surfaces 46 provide the axial pressure to the threaded fastener 50, thereby obviating a potential problem associated with the strength of the tool at the joinder of the drill bit 52 with the blade 42 as by welding. For this reason, the free end of the blade 42 desirably extends from the pressural surfaces 46 at a distance less than the depth of the groove 48 in the threaded fastener.

Also as shown in FIG. 6, the length of extension of the drill bit 52 from the end of the threaded fastener is, in the case of a tapered fastener, sufficient to intersect the lines of extension of the body of the threaded fastener.

As suggested in FIG. 8, the end of the screwdriver may be configured to fit the head of any suitable conventional threaded fastener and may be round as shown in FIG. 8, have a Phillips head configuration, etc.

With reference to the third embodiment illustrated in FIGS. 8 and 9, the shaft 60 of the tool may contain a central bore 62 and may be configured at the free end thereof to mate with the head 64 of any suitable conventional threaded fastener. The threaded fastener 64 is axially apertured to fit over the drill bit 66 when inserted into the bore 62 of the shaft 60. The axial extension of the drill bit 66 from the shaft 60 may be selectively maintained by means of a set screw 68 or other suitable friction device.

ADVANTAGES AND SCOPE OF INVENTION

As is readily apparent from the foregoing, the novel tool of the present invention may be used either as a drill bit, a screwdriver, or as a combination drill bit and screwdriver. In a first embodiment, the drill bits may be easily replaced and retained within the bore of the screwdriver shaft when not in use to preserve the sharpness of the drill bit.

These and many other advantages will be apparent to one skilled in the art from the claims when accorded a full range of equivalence, the embodiments herein described being illustrative and not limiting, and many other modifications will be readily apparent without departing from the scope of the invention.

What is claimed is:

1. A hand tool selectively configured for use as a drill, a screwdriver, and simultaneously as a drill and screwdriver when used with threaded fasteners having an axial bore comprising:

a handle;

a generally tubular shaft carried by said handle, said shaft being configured on the free end thereof for mating insertion into the groove in the head of a threaded fastener, said shaft having an axial bore extending from the free end thereof toward said handle, said shaft having a slot communicating with said bore along a portion of the length thereof intermediate the ends of said shaft;

a generally L-shaped drill bit adapted for insertion into the bore of said shaft through said slot with the major portion thereof disposed in the bore and the butt end thereof extending out of said bore and through said slot; and a collar carried by said tubular shaft, said collar including means for engaging the butt end of said drill bit and for maintaining said collar and thereby said drill bit in a selected portion relative to said shaft thereby maintaining a predetermined axial extension of said drill bit from the free end of said shaft, so that the hand tool may be selectively configured for use as a drill, a screwdriver and simultaneously as a drill and screwdriver, said collar including an L-shaped slot having one end of one arm thereof open toward the free end of said shaft so that said collar and the butt end of said drill bit may be axially moved into position where said collar may be rotated about said shaft to position the butt end of said drill bit in the closed end of the other arm thereof.

* * * * *